United States Patent [19]

Breher et al.

[11] Patent Number: 5,041,063

[45] Date of Patent: Aug. 20, 1991

[54] TOOTHED BELT OF ELASTOMERIC MATERIAL FOR REVERSIBLE TOOTHED BELT DRIVES, AND METHOD MAKING SAME

[75] Inventors: Rudolf Breher, Porta Westfalica; Rudi Kölling, Vlotho, both of Fed. Rep. of Germany

[73] Assignee: Breco kunststoffverarbeitungs-GmbH & Co. KG, Porta Westfalica

[21] Appl. No.: 586,418

[22] Filed: Sep. 21, 1990

[30] Foreign Application Priority Data

Sep. 21, 1989 [DE] Fed. Rep. of Germany ....... 3931480

[51] Int. Cl.⁵ .............................................. F16G 1/08
[52] U.S. Cl. ...................................... 474/205; 474/268
[58] Field of Search ............... 474/205, 237, 260, 264, 474/268, 271

[56] References Cited

U.S. PATENT DOCUMENTS 4,695,269  9/1987  Tassone et al. .................. 474/268
4,838,843  6/1989  Westhoff ........................... 474/205
4,846,771  7/1989  Kozachevsky et al. ........ 474/205 X Primary Examiner—Thuy M. Bui
Attorney, Agent, or Firm—Robert W. Becker & Associates

[57] ABSTRACT

A toothed belt where the crown surfaces of its teeth are to be disposed on the bases of gear wheel grooves is provided. In order to achieve a dampened, low-noise running-up of the toothed belt upon the gear wheel, as well as to achieve a free-of-play filling of the gear wheel grooves via the belt teeth in the direction of rotation as required for a reversible belt drive, embedded in the crown surface of each tooth belt is a crown piece made of a material that is elastically softer than the belt material. Viewed in the longitudinal cross-section of the belt, the crown piece extends essentially over the entire length of the crown surface of the belt tooth and protrudes from the crown surface in such a way that as the tooth runs up on the gear wheel, first the part of the curved outer side that protrudes the most strikes the base of the gear wheel groove, and subsequently this outer side is pressed flat against the groove by the belt tension. The inner side of the crown piece that is connected with the belt material is profiled and extends into the material of the belt tooth in such a way that the crown piece, when it spreads in the circumferential direction of the belt due to the radial compression, spreads the belt tooth out until both sides thereof contact the two sides of the gear wheel groove.

6 Claims, 4 Drawing Sheets

TOOTHED BELT OF ELASTOMERIC MATERIAL FOR REVERSIBLE TOOTHED BELT DRIVES, AND METHOD MAKING SAME

BACKGROUND OF THE INVENTION

The present invention relates to a toothed belt of elastomeric material for a belt drive consisting of a toothed belt and a gear wheel, with crown surfaces of the teeth of the belt being seated on the bases of the grooves of the gear wheel. The present invention also relates to a method of making such a toothed belt.

With the construction principle for producing toothed belt drives as known, for example, from DE-AS 27 21 800, the height of the belt teeth is less than the depth of the grooves of the gear wheel, with the bases of the grooves of the belt provided between the belt teeth resting upon the heads of the teeth of the gear wheel. A more advantageous construction principle is known, for example, from DE-AS 11 97 710, where the height of the belt teeth is greater than the depth of the gear wheel grooves, with the crown surfaces of the teeth of the belt being seated upon the bases of the gear wheel grooves. Pursuant to this construction principle, the entire radial height of the sides of the gear wheel are utilized for a power-transferring tooth side contact with the teeth of the belt, which manifests itself in an advantageous manner with regard to the surface pressure against the sides of the belt teeth, especially with the frequently very small radial side heights that exist. Although this is not important for the strength of the generally metal gear wheel when in order to increase the proportion of the force transfer due to friction between the contact surfaces of the toothed belt and gear wheel, which abut one another in the radial direction, within a predetermined tooth pitch, the peripheral spacing of the gear wheel teeth is great and in conformity therewith the peripheral length of the gear wheel teeth is small, none the less where the toothed belt is made of plastic or a similar material, the length of the bases of the belt teeth and hence the shearing strength of the belt teeth, is increased.

With a toothed belt drive of the aforementioned general type, where the height of the belt teeth is greater than the depth of the grooves of the gear wheel, and the crown surfaces of the belt teeth are seated upon the bases of the gear wheel grooves, as the length of the crown surfaces of the belt teeth in the circumferential direction of the belt increases in order to increase the force-transferring portion via friction, the noise also increases, which results as the belt teeth run up into the gear wheel grooves and is caused when the crown surfaces of the belt teeth strike the bases of the gear wheel grooves. Normally, with conventional tooth profiles the belt tooth, without meshing with the gear wheel, is somewhat shorter than the gear wheel groove in the direction of rotation of the belt drive in order for the belt teeth to be able to satisfactorily run up into the gear wheel grooves. However, for reversible toothed belt drives, it is often important and indispensible that when the belt tooth meshes with the gear wheel, the belt tooth contact both sides of the gear wheel groove without play. With the elastomeric material that is utilized in producing toothed belts, and that fulfills the requirements for strength and stability of the toothed belt and the belt teeth, which material is, for example, generally the plastic polyurethane, it is nearly impossible with the conventional operative belt tensions to such a way that the material can completely fill the gear wheel groove in a manner free of play as a result of a spreading that displaces the radial compression of the material volume of the belt tooth. A precondition for this would be a nearly already free-of-play meshing of the belt tooth in the gear wheel groove, and in order to then additionally obtain a satisfactory running-up of the belt teeth into the gear wheel grooves, complicated tooth shapes or tooth profiles would be necessary that would, of course, considerably increase the cost not only for manufacturing the toothed belt, but also for manufacturing the gear wheels that cooperate with the toothed belts during operation of a toothed belt drive.

It is therefore an object of the present invention to provide a toothed belt of the aforementioned general type where the noise that is generated when the toothed belt runs up onto a gear wheel is dampened and reduced, and where the belt teeth, prior to engagement with the gear wheel, are somewhat shorter in the direction of rotation than are the gear wheel grooves in order to be able to satisfactorily run up into the gear wheel grooves, yet where it is possible for the belt teeth to contact both sides of the gear wheel grooves in the free-of-play manner that is required for a reversible toothed belt drive.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
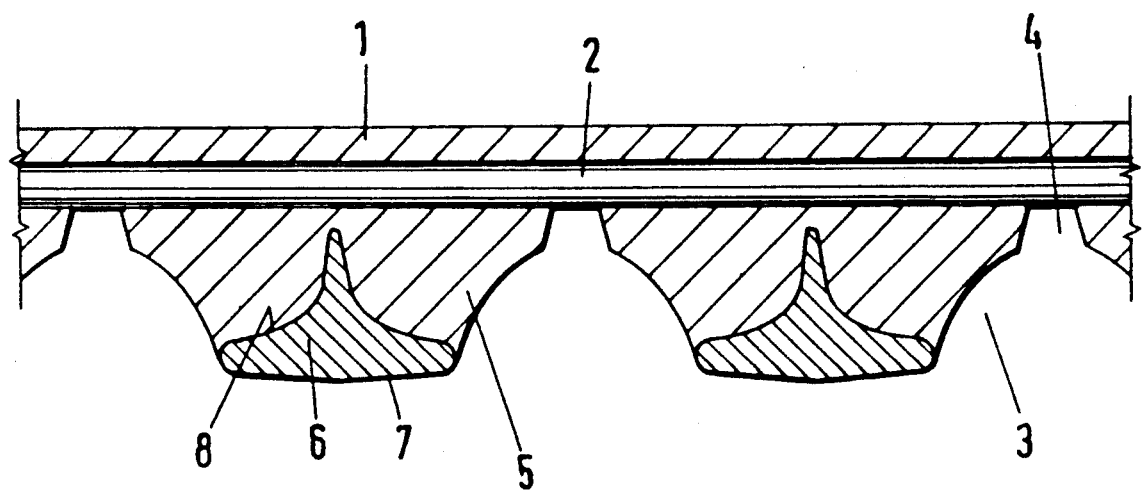
FIG. 1 is a longitudinal cross-sectional view through a portion of one exemplary embodiment of the inventive toothed belt.

The toothed belt of the present invention is characterized primarily in that: A respective crown piece is embedded in the crown surface of each belt tooth, with this crown piece being made of a material having a greater elasticity than that of the belt material, and with the crown piece extending over essentially the entire length of the crown surface of the belt tooth when viewed in a circumferential direction of the belt, with the crown piece, when viewed in a longitudinal cross-section of the belt, protruding from the crown surface of the belt tooth in such a way that when the belt runs up on the gear wheel, first a part of an outer surface of the crown piece that protrudes the furthest strikes the base of a gear wheel groove, and subsequently, via an operational, radial belt tension, the entire surface of the outer surface of the crown piece is compressed against the base of the gear wheel groove, and with an inner surface of the crown piece, which is connected to the material of the belt, when viewed in a longitudinal cross-section of the belt, being profiled and extending into the belt tooth in such a way that, due to the spreading of material in the longitudinal direction of the belt resulting from the radial compression of the material of the crown piece, the belt tooth is spread out until the two sides of the tooth rest against the two sides of the gear wheel groove.

The advantages achieved with the inventive measure, where crown pieces are embedded in the crown surfaces of the teeth of a toothed belt, for example a belt made of plastic or some other synthetic material, with the crown pieces being made of a plastic that is more softly elastic than the conventionally used belt plastic, are that the dampening of the noise is achieved via a measure undertaken right at the toothed belt itself, and not every gear wheel that is used with the toothed belt has to be provided with a measure to effect a dampening of noise, and that at the same time the crown pieces softly elastically displace a radial compression by spreading in the circumferential direction of the belt and in so doing to some extent spread the entire belt tooth in the circumferential direction of the belt by means of a sort of wedging of the material of the belt tooth, and thereby effects the free-of-play filling of the gear wheel groove that is required for the reversible toothed belt drive. For this purpose, the crown pieces when viewed in the longitudinal cross-section of the toothed belt can have an elliptical shape, for example via a uniform curvature of the outer side and the inner side. When viewed in the longitudinal cross-section of the toothed belt, the crown pieces preferably have a mushroom-like shape, with the stem extending into the material of the belt tooth, in order to thereby enhance the effect of the wedging of the material of the belt tooth in the circumferential direction of the belt. It is furthermore advantageous to embody the bases of the gear wheel grooves as linearly planar surfaces, rather than to give them the shape of a circular arc, so that the crown pieces have only to be radially compressed until their outer surface becomes flat or planar in order via the forced displaced spreading in the circumferential direction of the belt to press or spread the belt tooth apart for a free-of-play contact with both of the sides of the gear wheel groove.

Where the inventive toothed belt has a known fabric cover, for example made of nylon, that covers the toothed side of the belt, including the crown pieces, the method of the present invention is characterized by the steps of: In a first manufacturing step, introducing a fabric strip, which is made of a fabric that stretches elastically in a longitudinal direction of the fabric strip, between a rotatable molding wheel and cover means, whereby the molding wheel has distributed on its periphery, at prescribed distances from one another, cavities having a configuration that corresponds to the shape of a respective crown piece that is to be made of softly elastic material for a respective tooth of the belt and whereby the cover means is placed upon a portion of the periphery of the molding wheel and closes off the cavities along that peripheral portion to form hollow molding cavities, and further introducing softly elastic material into the molding wheel cavities, which are covered by the fabric strip, whereby the outer surface of the thus-formed crown piece, which outer surface faces toward the outer side of the belt that is to be produced, is molded onto the fabric strip; and in a second manufacturing step, forming a hollow molding space or chamber between a further rotatable molding wheel and a further cover means, whereby the further molding wheel is provided on its periphery with an annular recessed portion that corresponds to the profile of the belt that is to be produced, and the further cover means closes off a portion of the molding wheel recessed portion, furthermore introducing into the hollow molding chamber the fabric strip, with the crown pieces that are molded thereon being disposed on a radially outwardly directed side of the fabric strip, with the fabric strip being placed upon molding wheel teeth provided in the recessed portion thereof in such a way that each part of the fabric strip that enters the hollow molding chamber and is provided with one of the crown pieces disposes the crown piece above a groove in the molding wheel recessed portion between two of the teeth thereof, and furthermore introducing the elastomeric material for the belt at the beginning of the hollow molding chamber between the fabric strip and the further cover means, whereby due to the pressure of the introduced belt material, the parts of the fabric strip that carry the crown pieces are pressed into the grooves of the molding wheel recessed portion until the crown pieces contact bases of these grooves, accompanied by elastic stretching of the fabric strip, with the crown pieces thereby being fixedly fused with the material of the belt.

Further specific features of the present invention will be described in detail subsequently.

DESCRIPTION OF PREFERRED EMBODIMENTS

Referring now to the drawing in detail, the toothed belt 1 illustrated in FIG. 1 is comprised, for example, of polyurethane that is customarily used for toothed belts and has a Shore A hardness in the range of about 85–90, and furthermore includes a pull-resistant or inextensible reinforcing insert 2 that is embedded in the material of the belt. During the process of embedding the reinforcing insert 2 in the material of the belt, support means are used that support the reinforcing insert in the neutral bending zone of the toothed belt that is to be produced, and that in so doing provide at the base of the belt grooves 3 of the finished toothed belt recesses 4 that extend to the reinforcing insert 2. Embedded in the crown surface of each belt tooth 5 is a crown piece 6 that is made of a plastic having a greater, softer elasticity than does the plastic of the belt, with the plastic of the crown piece 6 fusing with the plastic of the belt. By way of example, the crown piece 6 can be made of a polyurethane having a Shore A hardness in the range of approximately 75–80. As viewed in a longitudinal cross-sectional view of the belt, the outer surface 7 of the crown piece 6 protrudes outwardly from the crown surface of the belt tooth 5. The crown piece inner surface 8, which is connected to the plastic of the belt, is profiled in such a way that when viewed in a longitudinal cross-sectional view of the toothed belt, the crown piece 6 has a mushroom-like shape the stem of which extends into the belt tooth 5 over nearly the entire height thereof, in other words, penetrates into the plastic of the belt tooth.

Figure 2:
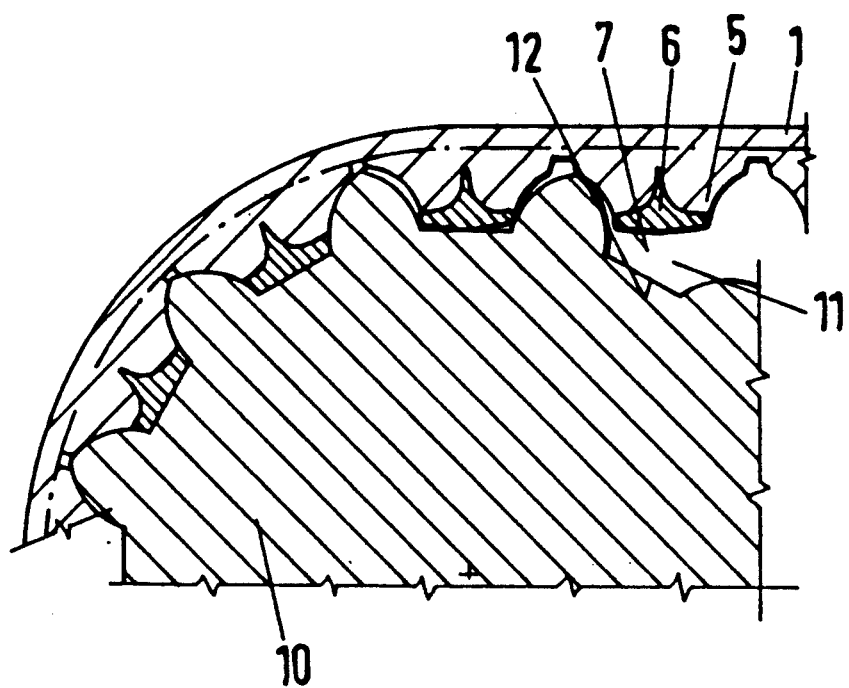
FIG. 2 shows the toothed belt of FIG. 1 as it meshes with a gear wheel.

FIG. 2 illustrates how the inventive toothed belt 1 cooperates with a gear wheel 10. The height of the teeth 5 of the toothed belt 1 is greater than the depth of the grooves 11 of the gear wheel, and in particular is such that the crown surface of the belt teeth 5 is seated on the base 12 of the gear wheel grooves 11. In addition, the toothed belt is dimensioned during manufacture in such a way that the length of the belt teeth 5 when viewed in the circumferential direction of the belt is somewhat shorter than the inside width of the gear wheel grooves 11 as viewed in the circumferential direction of the gear wheel. As a result, as the toothed belt 1 runs up on the gear wheel 10, the belt teeth 5 can satisfactorily enter the gear wheel grooves 11. A belt tooth 5 that only loosely meshes with a gear wheel groove 11 would have a play in the gear wheel groove in the circumferential direction of the belt drive that would be unacceptable for a reversible toothed belt drive. In practice each toothed belt has a certain amount of belt tension that radially presses the toothed belt against the periphery of the gear wheel. With the inventive toothed belt, when the toothed belt 1 runs up on the gear wheel 10, first the highest portion of the protruding outer surface 7 of the crown pieces 6 of the belt teeth 5 encounter the base 12 of the gear wheel grooves 11. As a consequence of the operative belt tension, the softly and elastically deformable crown pieces are then radially compressed until the entire surface of the outer surface 7 thereof rests upon the base 12 of the gear wheel grooves 11. The result is that the crown surfaces of the belt teeth do not come to rest upon the bases of the gear wheel grooves with a loud slapping noise rather, with the aid of the softly elastic crown pieces, the belt teeth run up into and rest upon the bases of the gear wheel grooves in an impact and noise-dampened manner. The compression of the softly elastically deformable crown pieces 6 under the effect of the operative belt tension has the further effect that during radial compression, the material of a crown piece, as soon as the outer surface 7 thereof has been pressed flat until it rests completely against the base 12 of a gear wheel groove, must spread in a different direction, i.e. must spread in the circumferential direction of the belt. As a result, with the aid of the crown piece 6 that inventively extends into the belt tooth 5, in particular via the crown piece inner surface 8 that in the illustrated embodiment has a mushroom-shaped cross-sectional configuration, the belt tooth 5 itself is elastically deformed by means of a sort of wedging of the material of the belt tooth, and is pressed somewhat apart in the circumferential direction of the belt, in such a way that both sides of the belt tooth come to rest without play against the two sides of the gear wheel groove. The gear wheel grooves 11 advantageously have a linear rather than a curved base 12, so that the outer surface 7 of the crown pieces 6 do not have to be unnecessarily radially compressed until they are curved inwardly in order to generate the pressing apart of the material of the belt tooth in the circumferential direction of the belt.

If the inventive toothed belt has a known and conventional fabric cover on its toothed belt side, including the crown pieces, the toothed belt can inventively be produced as follows.

Figure 3:
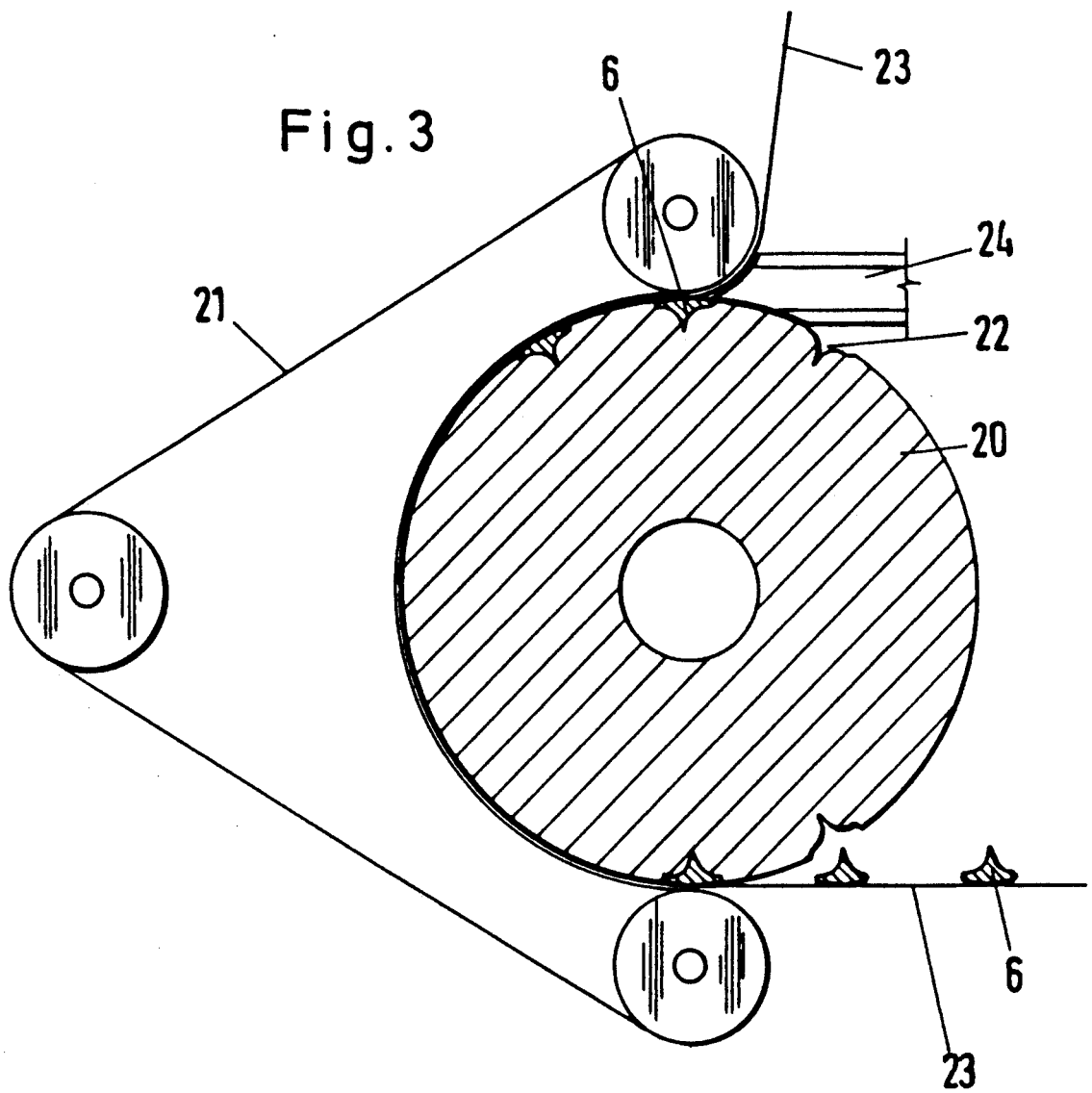
FIG. 3 shows an apparatus for carrying out the first step of the inventive process for producing a toothed belt.

For a first manufacturing step, an apparatus having a rotatable molding wheel 20 and a molding belt 21 that rotates with the molding wheel is used (see FIG. 3). The periphery of the molding wheel 20 is provided with cavities 22, the configuration of which corresponds to the shape of the belt crown pieces that are to be made of the softly elastic material, for example in the mushroom-like shape illustrated for the crown pieces 6 of the toothed belt 1 of FIG. 1. The cavities 22 are disposed at a prescribed distance from one another on the periphery of the molding wheel 20. The molding belt 21 rests against a portion of the periphery of the molding wheel 20 and closes off the cavities 22 thereof to form hollow mold cavities. Introduced between the molding wheel 20 and the molding belt 21 is the fabric strip 23, which is intended to cover the toothed side of the belt, and that can elastically stretch in a longitudinal direction; the fabric strip 23 is placed against the molding belt 21. An extruder nozzle 24 is disposed where the molding belt 21 and the molding wheel 20 come together, with the molding wheel 20 slides in a sealing manner along the radially inner side of the extruder nozzel, while the fabric strip 23 that rests upon the molding belt 21 sliding in a sealing manner along the radially outer side of the extruder nozzle. By means of this extruder nossel 24, the softly elastic elastomeric material is introduced between the fabric strip 23 and the molding wheel 20 into the molding wheel cavities 22 that are closed off by the molding belt 21 and are covered by the fabric strip 23 while forming hollow spaces. As a result, the individual crown pieces 6 are extruded onto the fabric strip 23; in particular, that side of the crown pieces 6 is disposed against the fabric strip 23 that when the tooth belt is finished is the outer crown piece surface 7 that is covered by the fabric strip 23. Due to the curvature of the periphery of the molding wheel 20 together with the molding belt 21 that is placed thereagainst, the outwardly protruding shape of the outer surface 7 of the crown pieces 6 as described in FIGS. 1 and 2 is produced.

Figure 4:
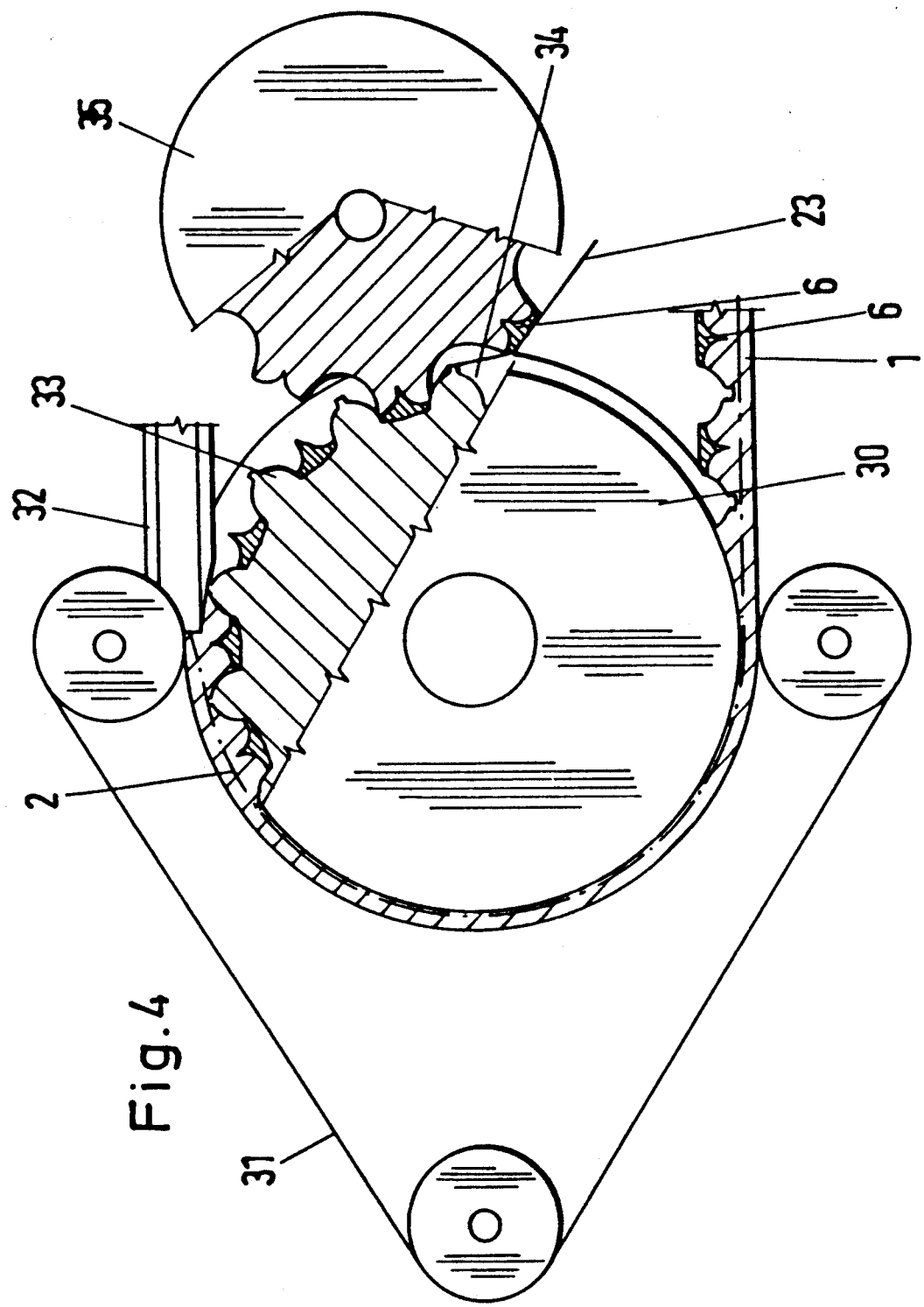
FIG. 4 shows an apparatus for carrying out a second step of the inventive method.

For a second manufacturing step, the apparatus illustrated in FIG. 4 is used, which also comprises a rotatable molding wheel 30 and a molding belt 31 that rotates with the molding wheel 30. The periphery of the molding wheel 30 is provided with an annular, gear-wheel like profiled recessed portion that corresponds to the profile of the tooth belt that is to be produced, with a portion of the periphery of the molding wheel 30, and hence a corresponding part of the recessed portion, being closed off to form a curved hollow molding space by the molding belt 31 that is placed upon the molding wheel 30. The beginning of the hollow molding space is closed off by an extruder nozzle 32, on the radially outer side of which the molding belt 31 slides along in a sealing manner. By means of this extruder nozzle 32, not only the elastomeric material that is intended for the toothed belt, but also the pull-resistant reinforcing insert 2 that is to be embedded in the material of the toothed belt as described in conjunction with FIG. 1, are introduced into the hollow molding chamber. At any given time, at least one tooth 33 of the molding wheel 30 always cooperates with the radially inner side of the extruder nozzel 32 in a sealing manner to prevent elastomeric material that has been introduced from escaping from the start of the hollow molding chamber. The fabric strip 23 that was provided with the crown pieces 6 in the first manufacturing step, with the extruded crown pieces 6 being disposed on the radially outer side of the fabric strip 6, is introduced into the hollow molding chamber between the molding wheel 30 and the extruder nozzle 32. As the fabric strip 23 runs up onto the molding wheel 30, the crown pieces 6 that are carried by the fabric strip 23 are picked up by an auxiliary wheel 35, which precisely introduces the crown pieces 6 into the grooves 34 of the molding wheel 30 and places them upon the bases of these molding wheel grooves. In this way, the crown pieces can reliably run up into the hollow molding space between the molding wheel 30 and the extruder nozzle 32. In addition, the base of each groove 34 of the molding wheel 30 can expediently be provided with a small, non-illustrated needle means upon which the crown piece 6 that is pressed down into the molding wheel groove 34 by the auxiliary wheel 35 is fed and which thereby reliably holds the crown piece in place as the latter runs up into the hollow molding chamber. In the hollow molding chamber, the crown pieces 6 and the fabric strip 23 are then completely pressed into the grooves 34 of the molding wheel 30 by the pressure of the elastomeric material that is introduced into the hollow molding chamber between the molding belt 31 and the fabric strip 23. At the same time, the radially outwardly directed side of the crown pieces 6 is melted by belt material that is introduced, so that the crown pieces 6 are fixedly fused to the material of the belt.

The present invention is, of course, in no way restricted to the specific disclosure of the specification and drawings but also encompasses any modifications within the scope of the appended claims.

What we claim is:

1. A toothed belt of elastomeric material for a belt drive consisting of a toothed belt and a gear wheel, with crown surfaces of teeth of the belt being seated on bases of grooves of the gear wheel, said belt comprising:
    a respective crown piece embedded in the crown surface of each belt tooth, with said crown piece being made of a material having a greater elasticity than that of the belt material, and with said crown piece extending over essentially the entire length of the crown surface of the belt tooth when viewed in a circumferential direction of the toothed belt, with said crown piece, when viewed in a longitudinal cross-section of said belt, protruding from said crown surface of said belt tooth in such a way that when said toothed belt runs up on said gear wheel, first a part of an outer surface of said crown piece that protrudes the furthest strikes one of said bases of said gear wheel grooves, and subsequently, via an operational radial belt tension, the entire surface of said outer surface of said crown piece is compressed against said base of said gear wheel groove, and with an inner surface of said crown piece, which is connected to said material of said toothed belt, when viewed in a longitudinal cross-section of said belt, being profiled and extending into said belt tooth in such a way that, due to the spreading of material in the longitudinal direction of said toothed belt resulting from the radial compression of said material of said crown piece, said belt tooth is spread out until sides of said belt tooth rest against sides of said gear wheel groove.

2. A toothed belt according to claim 1, which includes a fabric cover that covers a toothed side of said belt, including said crown pieces.

3. A toothed belt according to claim 1, in which when viewed in the longitudinal cross-section of said belt, each of said crown pieces has a mushroom-shaped contour including a stem that extends into the material of said belt tooth.

4. A toothed belt according to claim 3, in which said stem of said mushroom-shaped crown piece contour extends over nearly the entire height of said belt tooth.

5. A toothed belt according to claim 1, for use with a gear wheel where the bases of the grooves thereof have a linear, planar configuration.

6. A method of producing a toothed belt of elastomeric material for a belt drive consisting of a toothed belt and a gear wheel, with crown surfaces of teeth of said belt being seated on bases of grooves of said gear wheel, said method including the steps of:
    in a first manufacturing step, introducing a fabric strip, which is made of a fabric that stretches elastically in a longitudinal direction of said fabric strip, between a rotatable molding wheel and cover means, whereby said molding wheel has distributed on its periphery, at prescribed distances from one another, cavities having a configuration that corresponds to the shape of a respective crown piece that is to be made of softly elastic material for a respective one of said teeth of said toothed belt, and whereby said cover means is placed upon a portion of the periphery of said molding wheel and closes off said cavities along said peripheral portion to form hollow molding cavities, and further introducing softly elastic material into said molding wheel cavities, which are covered by said fabric strip, whereby the outer surface of the thus-formed crown pieces, which outer surface faces toward the outer side of said toothed belt that is to be produced, is molded onto said fabric strip; and
    in a second manufacturing step, forming a hollow molding chamber between a further rotatable molding wheel and a further cover means, whereby said further molding wheel is provided on its periphery with an annular recessed portion that corresponds to the profile of said toothed belt that is to be produced, and said further cover means closes off a portion of said molding wheel recessed portion, furthermore introducing into said hollow molding chamber said fabric strip, with said crown pieces that are molded thereon being disposed on a radially outwardly directed side of said fabric strip, with said fabric strip being placed upon molding wheel teeth provided in said recessed portion thereof in such a way that each part of said fabric strip that enters said hollow molding chamber and is provided with one of said crown pieces disposes said crown piece above a groove in said molding wheel recessed portion between two of said teeth thereof, and furthermore introducing said elastomeric material for said toothed belt at the beginning of said hollow molding chamber between said fabric strip and said further cover means, whereby due to the pressure of the introduced belt material, said parts of said fabric strip that carry said crown pieces are pressed into said groove of said molding wheel recessed portion until said crown pieces contact the bases of said grooves, accompanied by elastic stretching of said fabric strip, with said crown pieces thereby being fixedly fused with said material of said toothed belt.

* * * * *

UNITED STATES PATENT AND TRADEMARK OFFICE
CERTIFICATE OF CORRECTION

PATENT NO. : 5,041,063
DATED : Aug. 20, 1991
INVENTOR(S) : RUDOLF BREHER ET AL

It is certified that error appears in the above-identified patent and that said Letters Patent is hereby corrected as shown below:

On the Title Page and Col. 1, lines 1-4, item

[54] TOOTHED BELT OF ELASTOMERIC MATERIAL FOR REVERSIBLE TOOTHED BELT DRIVES, AND METHOD OF MAKING SAME

On the Title Page item

[73] Assignee: BRECO Kunststoffverarbeitungs- GmbH & Co. KG, Porta Westfalica, W. Germany Signed and Sealed this Twenty-second Day of December, 1992

Attest:

DOUGLAS B. COMER

*Attesting Officer*   *Acting Commissioner of Patents and Trademarks*